July 21, 1942.   H. C. GRANT, JR   2,290,177
VALVE
Filed Jan. 17, 1940

INVENTOR
Harry C. Grant Jr.
BY J. William Carson
ATTORNEY

Patented July 21, 1942

2,290,177

UNITED STATES PATENT OFFICE 2,290,177

VALVE

Harry Campbell Grant, Jr., New York, N. Y., assignor to Specialties Development Corporation, Bloomfield, N. J., a corporation of New Jersey Application January 17, 1940, Serial No. 314,239

4 Claims. (Cl. 251—160)

This invention relates to valves and more particularly to valve members adapted to control the passage of fluid media under comparatively high pressures, such as met with in the handling of liquid carbonic acid.

Valves of the character referred to are usually disc shaped and are held to their seats by the pressure of the confined fluid, often assisted by a spring. The actual sealing is accomplished by a portion of the valve which is resilient, and is formed of a composition comprising rubber and cork, combining the compression characteristics of both these ingredients.

However, in spite of definite advantages of this composition over other resilient valve materials, the very high pressure to which the valve is subjected, causes the deterioration of the resilient portion thereof within a comparatively short period of time and necessitates its renewal.

This relative lack of reliability of the valve led to a quest for an improvement in its performance, and an analysis of the destructive factors involved, disclosed that the inherent cold flow of this type of material under compression is the cause for lateral forces within the structure of the valve member, and is the reason for bulges and subsequent cracking when such cold flow is opposed by confining means, as for instance, by the usual cup-shaped valve head in which the resilient member is confined, and by the confining of the central portion of the sealing member due to compression by the ring-formed valve seat.

The present invention has for its object the elimination of this defect of the type of resilient valve member referred to, and which is subjected to high seating pressures, by deflecting stresses set up within the member in a harmless direction, thereby making the formation of bulges and subsequent cracking of the material impossible.

It is another object to provide a valve consistent with the first named object having a stress deflecting member arranged within the sealing member of the valve which is of a shape so as to best counteract the internal stresses in the sealing member in accordance with their relative distribution therein.

It is a further object to provide a valve which has sealing member confining means which are shaped interiorly in conformance with the relative peripheral stress distribution in the sealing member.

These and other objects of the invention will be best and more fully understood from the following detailed description of illustrative embodiments thereof, and from the accompanying drawing, wherein.

Figure 1:
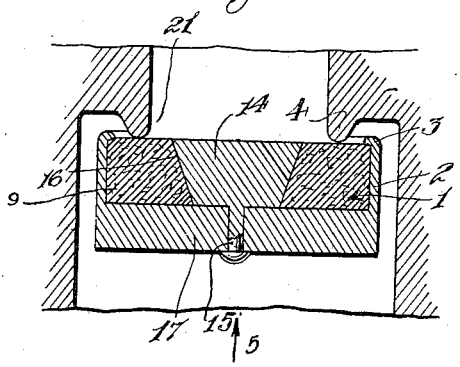
Figure 1 is a diagrammatical section of a valve in accordance with the present invention.

In the figures, wherein the same references have been used for the same elements, 1 refers to a conventional disc type resilient sealing member, formed of a composition including rubber and cork, the exact proportions of which are determined by the desired resiliency and flow characteristics. The composition, however, of the sealing member will not be gone into in any further detail as it does not form any part of this invention.

The sealing member confining means, which is a cup-shaped metallic member 2 usually made of brass, has its upper rim turned over as at 3 to properly retain the sealing member. The valve is shown to be seated on the annular seat 4, and pressed thereon by fluid pressure acting on the back of the valve in the direction of the arrow as shown at 5.

Sectional areas 9 indicate approximately the part of sealing member 1 subject to compression due to the seat 4, which compressive forces result in lateral compression of the central portion of the sealing member situated between said areas 9. These lateral forces with respect to the central portion of the sealing member decrease in unit intensity toward the bottom of the sealing member, that is, they are inversely proportional to the distance from the point of maximum compression near the seat 4. If the central portion 11 of the sealing member referred to above be imagined to be divided into horizontal layers, it will be seen that due to lateral compression as explained above, such layers tend to be forced upward with resultant tensile stresses therebetween. It is in the nature of the material of which the sealing member is composed that it is weak in tension and that such internal tensile stresses result in surface bulges and finally in the rupture of these layers. Similar stresses are set up near the upper periphery of the sealing member between seat 4 and confining means 3.

Figure 1 shows the vulnerable central portion which is subject to lateral compression substituted by a spacer member 14 secured to the bottom of the cup-shaped retaining member 2 at 15, and having an inverted frusto-conical shape in accordance with the internal stress distribution described above. The contact surface 16 between sealing member 1 and spacer 14 which slopes downwardly and inwardly, causes said lateral forces to be deflected downwardly and to be harmlessly dissipated against the bottom 17 of the retaining cup 2.

Figure 2:
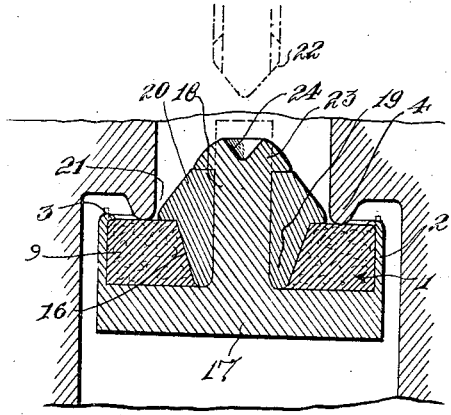
Figure 2 shows in section an illustrative embodiment of the invention.

In Figure 2, there is shown in section, another valve constructed in accordance with the present invention. A stem 18 is seen to be protruding centrally through the ring-formed sealing member 1, which may be integrally formed with the base 17 of the cup-shaped retaining member 2. An inverted frusto-conically shaped preferably metallic bushing 19 is slipped over stem 18 with its smaller base resting at the foot of stem 18 on the base 17 of the cup 2. The bushing 19 protrudes to some extent above the sealing member 1, and is shaped to form a flange adapted to overlie the sealing member surface as at 20. This flange formation partly serves to further reinforce the sealing member, and partly to act as a guide for the valve as a whole with respect to the cylindrical space 21 defined by the circular seat 4 to which the flange rather closely conforms in its outside diameter. This is of practical importance when the valve, as in this case, is of a non-attached type and adapted to be actuated by an actuating pin indicated at 22 normally out of contact with the actual valve. The stem 18 is seen to be riveted over the top of flange formation 20 as at 23, and suitably recessed at 24 for the reception of actuating pin 22.

Figure 3:
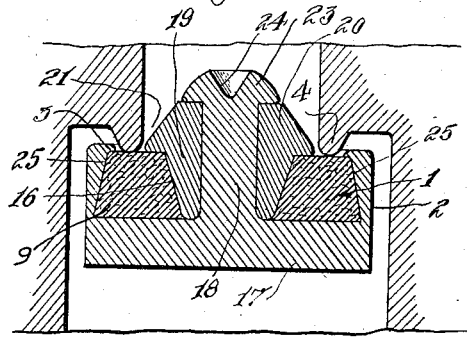
Figure 3 is the sectional view of another embodiment of the invention.

In Figure 3, the same principle is illustrated as applied to the peripheral portions of the sealing ring 9 by providing outwardly sloping interior walls 25 in the cup-shaped retaining member 2. The sealing ring is shaped to conform thereto. From an inspection of this drawing in the light of the analysis presented above, it will be seen that this represents the ultimate application of the principle involved in accordance with the present invention resulting in a practical elimination of all bulges in the sealing member due to the seating pressure.

While I have described preferred embodiments of my invention, it will be understood that they are to be taken as illustrative and not limitative, and that I reserve the right to make such changes in form, construction and arrangement of parts as fall within the spirit and scope of the following claims.

I claim:

1. A valve member suitable for sealing an annular seat used in connection with a high pressure fluid medium, said member comprising a cup-shaped retaining member having a substantially cylindrical side wall and a bottom; an annular disc-shaped packing member formed of a resilient material in said retaining member, the upper edge of said side wall extending inwardly and confining said packing member in said retaining member in unstressed condition to substantially maintain its natural elasticity, said packing member having an inverted substantially frusto-conical centrally located aperture therein and being adapted to be axially compressed along an annular section thereof corresponding substantially to the valve seat when seated thereon and being subject to radial lateral compression as a consequence thereof at portions radially inwardly of the annular section; and a rigid member secured to said retaining member and extending through said aperture, said rigid member having a frusto-conical portion conforming substantially to the shape of the aperture of said packing member and engaging said packing member at the aperture; said packing member being adapted to be pressed against the valve seat to cause compression of said packing member whereby lateral forces in the packing member acting against said rigid member are deflected downwardly by said frusto-conical portion of said rigid member and are directed against the bottom of said retaining member to prevent upward buckling of said packing member.

2. A valve member suitable for sealing an annular seat used in connection with a high pressure fluid medium, said member comprising a cup-shaped retaining member having a side wall and a bottom; an annular disc-shaped packing member confined in said retaining member in unstressed condition to substantially maintain its natural elasticity, said packing member having an inverted substantially frusto-conical centrally located aperture therein and being adapted to be axially compressed along an annular section thereof corresponding substantially to the valve seat when seated thereon and being subject to radial lateral compression as a consequence thereof at portions radially inwardly of the annular section; a rigid member extending through said aperture, having an inverted frusto-conical portion conforming substantially to the shape of the aperture of said packing member and engaging said packing member at the aperture and having a second frusto-conical portion above said packing member for guiding the valve member into seating relation; and means for securing said rigid member to said retaining member.

3. A valve member suitable for sealing an annular seat used in connection with a high pressure fluid medium, said member comprising a cup-shaped retaining member having a side wall and a bottom provided with an upwardly extending stem portion; an annular substantially disc-shaped packing member confined in said retaining member in unstressed condition to substantially maintain its natural elasticity, said packing member having an inverted substantially frusto-conical centrally located aperture therein and being adapted to be axially compressed along an annular section thereof corresponding substantially to the valve seat when seated thereon and being subject to radial lateral compression as a consequence thereof at portions radially inwardly of the annular section; and a rigid member having an inverted frusto-conical portion conforming substantially to the shape of the aperture of said packing member and engaging said packing member at the aperture, and having a second frusto-conical portion adjacent said first frusto-conical portion and partially overlying said packing member, said rigid member having an aperture for receiving said stem portion, the upper end of said stem portion being flanged outwardly to secure said rigid member to said retaining member.

4. A valve member suitable for sealing an annular seat used in connection with a high pressure fluid medium, said member comprising a cup-shaped retaining member having a substantially cylindrical side wall and a bottom; an annular disc-shaped packing member formed of a resilient material in said retaining member, the upper edge of said side wall extending inwardly and confining said packing member in said retaining member in unstressed condition to substantially maintain its natural elasticity, said packing member having an inverted substantially frusto-conical centrally located aperture therein and being adapted to be axially compressed along an annular section thereof corresponding substantially to the valve seat when seated thereon and being subject to radial lateral compression as a consequence thereof at portions radially inwardly of the annular section; and a rigid member secured to said retaining member and extending through said aperture, said rigid member having a frusto-conical portion conforming substantially to the shape of the aperture of said packing member and engaging said packing member at the aperture, said rigid member having a portion adjacent said frusto-conical portion and partially overlying said packing member; said packing member being adapted to be pressed against the valve seat to cause compression of said packing member whereby lateral forces in the packing member acting against said rigid member are deflected downwardly by said frusto-conical portion of said rigid member and are directed against the bottom of said retaining member to prevent upward buckling of said packing member.

HARRY CAMPBELL GRANT, JR.